US012668155B2

(12) United States Patent
Muramatsu

(10) Patent No.: US 12,668,155 B2
(45) Date of Patent: Jun. 30, 2026

(54) VEHICLE REAR SEAT STRUCTURE AND VEHICLE

(71) Applicant: TOYOTA JIDOSHA KABUSHIKI KAISHA, Toyota (JP)

(72) Inventor: Tomohiro Muramatsu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 345 days.

(21) Appl. No.: 18/492,793

(22) Filed: Oct. 24, 2023

(65) Prior Publication Data

US 2024/0198861 A1 Jun. 20, 2024

(30) Foreign Application Priority Data

Dec. 20, 2022 (JP) ................................. 2022-203676

(51) Int. Cl.
*B60N 2/00* (2006.01)
*B60N 2/005* (2006.01)
*B60K 1/04* (2019.01)

(52) U.S. Cl.
CPC ................ *B60N 2/005* (2013.01); *B60K 1/04* (2013.01); *B60K 2001/0433* (2013.01)

(58) Field of Classification Search
CPC .............. B60K 1/04; B60K 2001/0433; B60K 2001/0422; B60N 2/005

USPC .......................................................... 296/64
See application file for complete search history.

(56) References Cited

U.S. PATENT DOCUMENTS

| | | | |
|---|---|---|---|
| 10,486,514 B2 * | 11/2019 | Takayanagi | B60L 50/70 |
| 2013/0220713 A1 * | 8/2013 | Watanabe | H01M 10/613 |
| | | | 180/65.1 |
| 2018/0244142 A1 | 8/2018 | Takayanagi et al. | |
| 2018/0370404 A1 * | 12/2018 | Miyawaki | B60N 2/68 |
| 2023/0158898 A1 * | 5/2023 | Yamamoto | B62D 25/24 |
| | | | 180/279 |
| 2024/0072356 A1 * | 2/2024 | Sugihara | H01M 50/227 |
| 2025/0276740 A1 * | 9/2025 | Inoue | B62D 25/20 |

FOREIGN PATENT DOCUMENTS

| | | |
|---|---|---|
| JP | 2001-294048 A | 10/2001 |
| JP | 2011-126439 A | 6/2011 |
| JP | 2015-217820 A | 12/2015 |
| JP | 6442609 B2 | 12/2019 |

* cited by examiner

*Primary Examiner* — Steven O Douglas
(74) *Attorney, Agent, or Firm* — SOLARIS Intellectual Property Group, PLLC

(57) ABSTRACT

A vehicle rear seat structure includes: a rear seat disposed at a rear part inside a vehicle cabin; a battery unit disposed at a vehicle lower side of the vehicle rear seat; and a resin pedestal provided between the rear seat and the battery unit, the pedestal having a plate thickness in a vehicle vertical direction, and an upper surface of the pedestal being formed in a shape that conforms to the rear seat.

4 Claims, 3 Drawing Sheets

VEHICLE REAR SEAT STRUCTURE AND VEHICLE

CROSS-REFERENCE TO RELATED APPLICATION

This application is based on and claims priority under 35 USC 119 from Japanese Patent Application No. 2022-203676, filed on Dec. 20, 2022, the disclosure of which is incorporated by reference herein.

BACKGROUND

Technical Field

The present disclosure relates to a vehicle rear seat structure and a vehicle.

Related Art

Japanese Patent No. 6442609 discloses a structure in which a battery unit is disposed below a floor panel forming a floor surface of a vehicle. Moreover, in the vehicle described in Japanese Patent No. 6442609, a portion of a battery module configuring a battery unit is disposed below a rear seat.

Note that since a battery module includes a cooling fan, wiring, and the like in addition to a battery, there is a possibility that an upper surface of the battery module is formed in an uneven shape. For this reason, there is room for improvement in order to obtain a structure that is comfortable to sit on in a structure in which a battery module is disposed below a rear seat such as in the vehicle described in U.S. Pat. No. 6,442,609.

SUMMARY

The present disclosure provides a vehicle rear seat structure and a vehicle that can maintain favorable seating comfort of a rear seat in a structure in which a battery is disposed below the rear seat.

A vehicle rear seat structure according to a first aspect includes: a rear seat disposed at a rear part inside a vehicle cabin; a battery unit disposed at a vehicle lower side of the vehicle rear seat; and a resin pedestal provided between the rear seat and the battery unit and having a vehicle vertical direction as a plate thickness direction thereof, an upper surface of the pedestal being formed in a shape that conforms to the rear seat.

In the rear seat structure of the first aspect, a rear seat is disposed at a rear part of the vehicle cabin, and a battery unit is disposed below the rear seat. Further, a resin pedestal is provided between the rear seat and the battery unit, and the pedestal is formed in a shape in which a vertical direction of the vehicle is a plate thickness direction and an upper surface thereof conforms to the rear seat. By providing a pedestal between the rear seat and the battery unit and forming the upper surface of the pedestal in conformity with the rear seat in this way, even in cases in which the upper surface of the battery unit is formed in an uneven shape, the riding comfort of the rear seat can be made favorable.

A vehicle rear seat structure according to a second aspect is the first aspect, in which the pedestal is provided with a side wall portion that covers a side face of the battery unit from an outer side in a vehicle width direction.

In the rear seat structure of the second aspect, the side face of the battery unit is covered from the outer side in the vehicle width direction by the side wall portion of the pedestal. This enables the battery to be protected by the side wall portion during a side collision of the vehicle.

A vehicle rear seat structure according to a third aspect is the first aspect, in which a concave part is formed at a lower surface of the pedestal, the concave part corresponding to a convex part formed at an upper surface of the battery unit.

In the rear seat structure of the third aspect, a convex part on the battery unit side can be engaged with a concave part formed on the bottom surface of the pedestal, and the pedestal and the battery unit can be brought into close contact with each other.

A vehicle rear seat structure according to a fourth aspect is the first aspect, in which the pedestal is formed by a plurality of resin members that are joined in a vehicle width direction.

In the rear seat structure of the fourth aspect, since the pedestal is formed by joining plural resin components, compared to a structure in which the pedestal is integrally formed of resin, the components can be efficiently transported. Moreover, since large-scale devices are not required to mold the pedestal, this enables increases in manufacturing costs to be suppressed.

A vehicle according to a fifth aspect has the vehicle rear seat structure of any one of the first aspect to fourth aspects.

In a vehicle according to the fifth aspect, even in cases in which the battery is disposed below the rear seat and the upper surface of the battery unit is formed in an uneven shape, the riding comfort of the rear seat can be made favorable.

According to the vehicle rear seat structure and the vehicle of the present disclosure, in a structure in which the battery is disposed below the rear seat, the seating comfort of the rear seat can be maintained favorably.

BRIEF DESCRIPTION OF THE DRAWINGS

An exemplary embodiment of the present disclosure will be described in detail based on the following figures, wherein.

DETAILED DESCRIPTION

Figure 1:
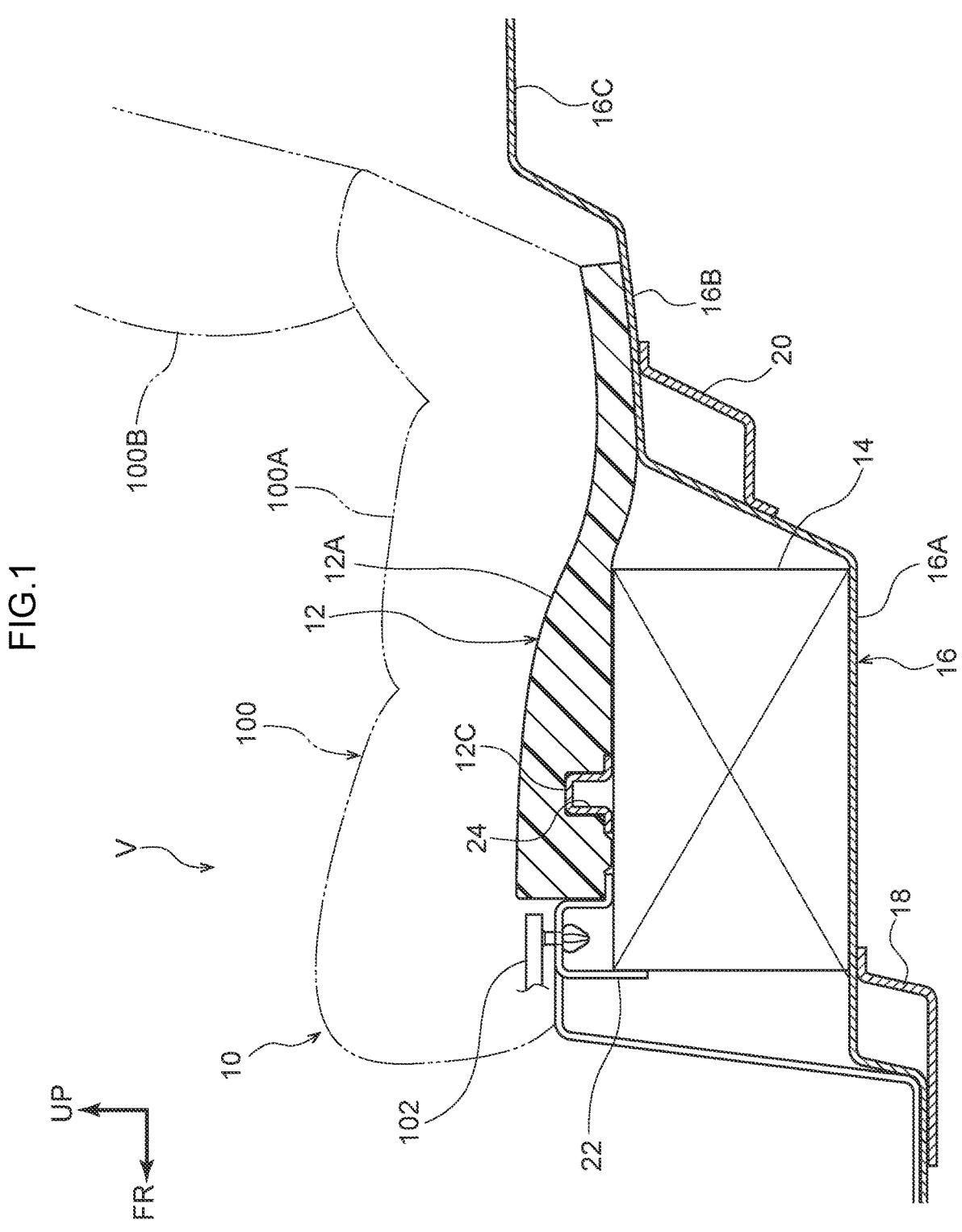
FIG. 1 is a side cross-sectional view schematically illustrating a rear section of a vehicle to which a vehicle rear seat structure according to an exemplary embodiment is applied.

Explanation follows regarding a vehicle rear seat structure 10 according to an exemplary embodiment, with reference to the drawings. Note that the arrow FR, the arrow UP, and the arrow LH illustrated in the drawings respectively indicate a front side in a vehicle longitudinal direction, an upper side in a vehicle vertical direction, and a left side of a vehicle facing a travel direction in a vehicle V to which the vehicle rear seat structure 10 is applied, as appropriate. In the following explanation, when reference is simply made to a front/rear, vertical, or left/right direction, these shall indicate front/rear in a vehicle longitudinal direction, vertical in a vehicle vertical direction, and left/right direction in a vehicle width direction, unless otherwise specified.

As illustrated in FIG. 1, a rear seat 100 is disposed at a rear section of a vehicle V to which the vehicle rear seat structure 10 is applied, and a battery unit 14 is disposed below the rear seat 100. The battery unit 14 is configured to be capable of supplying power to a motor, which is a drive source for the vehicle V, through a non-illustrated wire harness. As an example, the vehicle V of the present exemplary embodiment is a hybrid electric vehicle (HEV) including an engine and a motor as a drive source, but may be applied to a battery electric vehicle (BEV) including only a motor as a drive source.

The battery unit 14 is fixed onto the floor panel 16. The floor panel 16 is formed in a substantially stepped shape such that a vehicle rear side thereof is positioned higher than a vehicle front side thereof, and is configured including a lower step part 16A, a middle step part 16B, and an upper step part 16C in this order from the bottom. The battery unit 14 is fixed to the lower step part 16A of the floor panel 16.

The floor panel 16 includes a middle step part 16B rearward of the lower step part 16A with a step therebetween, and the upper step part 16C is provided rearward of the middle step part 16B with a step therebetween. The upper step part 16C forms a floor surface of the luggage space.

A first reinforcing member 18 having a substantially L-shaped cross section is joined to a front end portion of the lower step part 16A of the floor panel 16, and a closed cross section is configured by the first reinforcing member 18 and the floor panel 16. Moreover, a second reinforcing member 20 having a substantially L-shaped cross section is joined to a front end portion of the middle step part 16B of the floor panel 16, and the second reinforcing member 20 and the floor panel 16 form a closed cross section.

A convex part 24 having a substantially hat-shaped cross section is formed on an upper surface of the battery unit 14. The convex part 24 extends in the widthwise direction of the vehicle. A wire harness or the like is provided in a space between the convex part 24 and the upper surface of the battery unit 14.

A mounting bracket 22 is provided at an upper portion of a front end of the battery unit 14. A cross section of the mounting bracket 22 as viewed from a vehicle width direction is substantially U-shaped with an opened lower side, and a front end part of the mounting bracket 22 is joined to a front surface of the battery unit 14. A rear end part of the mounting bracket 22 is bent along the upper surface of the battery unit 14, and is joined to an upper surface of the battery unit 14. The seat frame of the rear seat 100 is attached to the mounting bracket 22. As described above, the upper surface of the battery unit 14 of the present exemplary embodiment is formed in an uneven shape by the convex part 24, the mounting bracket 22, and the like.

A resin pedestal 12 is provided between the rear seat 100 and the battery unit 14. Explanation follows regarding the detailed structure of the pedestal 12.

(Pedestal 12)

Figure 2:
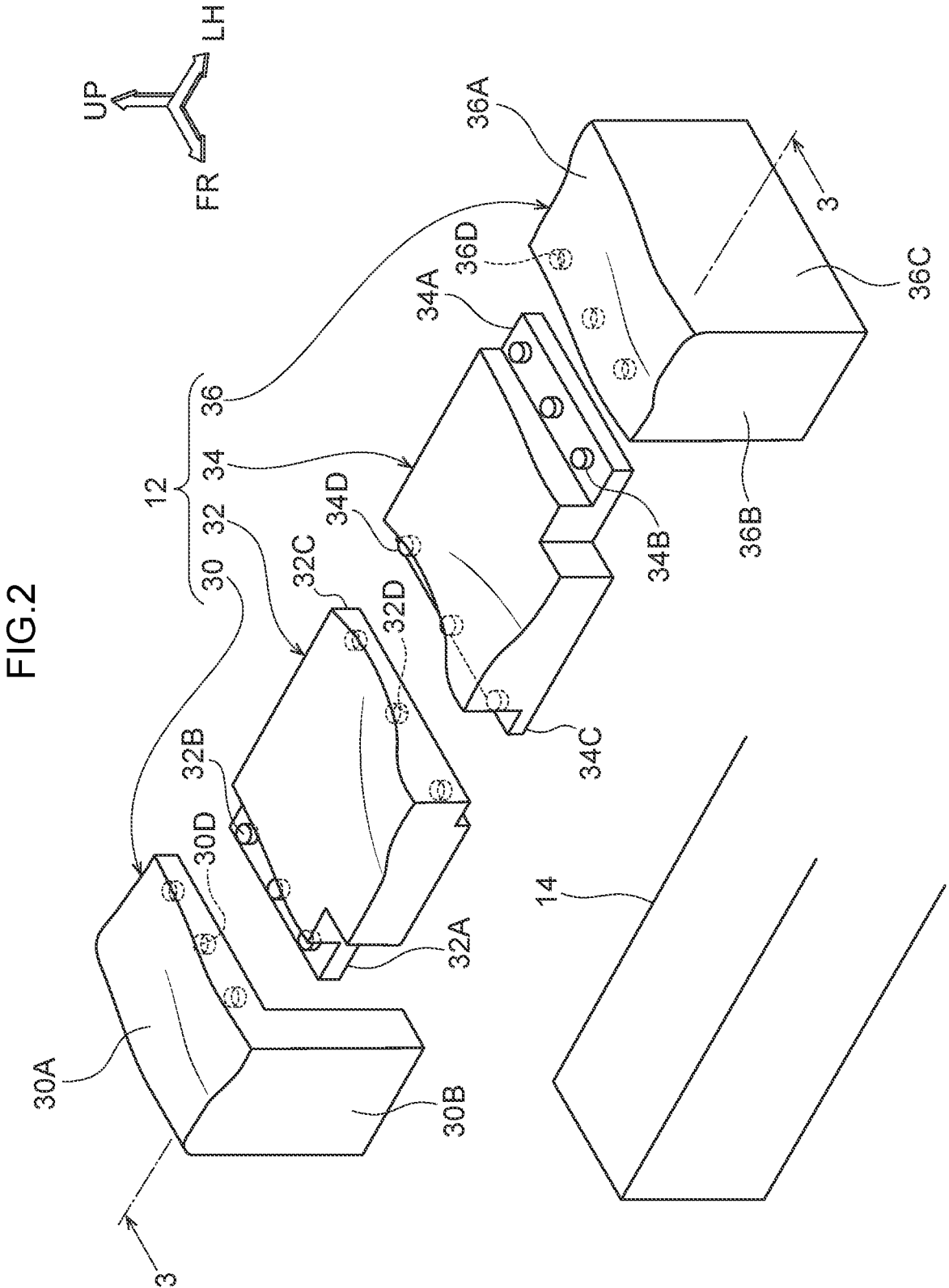
FIG. 2 is an exploded perspective view illustrating a battery unit and a pedestal in an exemplary embodiment.

As illustrated in FIG. 2, the pedestal 12 of the present exemplary embodiment is formed of four resin components; namely, a first resin component 30, a second resin component 32, a third resin component 34, and a fourth resin component 36, joined in a vehicle width direction.

The first resin component 30 configures a vehicle right end portion of the pedestal 12. The first resin component 30 is configured including an upper wall section 30A, a front wall section 30B, and a right wall section 30C (see FIG. 3). Three engagement grooves 30D are formed in the lower surface of the upper wall section 30A of the first resin component 30 and are hollowed out in a substantially cylindrical shape.

The second resin component 32 is disposed to the left of the first resin component 30. The entirety of the second resin component 32 extends in the vehicle longitudinal direction and in the vehicle width direction, with the vertical direction of the vehicle serving as the thickness direction, and an upper surface of the second resin component 32 is formed in a curved surface that is continuous with the upper wall section 30A of the first resin component 30.

An engagement piece 32A extends from the right end portion of the second resin component 32 toward the right side of the vehicle. The engagement piece 32A extends from a lower portion of the second resin component 32 to the right side of the vehicle, and three substantially cylindrical engagement protrusions 32B are formed on an upper surface of the engagement piece 32A. The three engagement projections 32B are respectively formed in shapes corresponding to the engagement grooves 30D of the first resin component 30, and the first resin component 30 and the second resin component 32 are coupled together by engaging the engagement protrusions 32B with the engagement grooves 30D.

An engagement piece 32C extends from the left end portion of the second resin component 32 toward the left side of the vehicle. The engagement piece 32C extends from an upper portion of the second resin component 32 to the left side of the vehicle, and three engagement grooves 32D hollowed out in a substantially cylindrical shape are formed on a lower surface of the engagement piece 32C.

A third resin component 34 is disposed to the left of the second resin component 32. The entirety of the third resin component 34 extends in the vehicle longitudinal direction and in the vehicle width direction, with the vertical direction of the vehicle serving as the thickness direction, and the upper surface of the third resin component 34 is formed in a curved surface that is continuous with the upper surface of the second resin component 32.

An engagement piece 34A extends from a left end portion of the third resin component 34 toward a left side of the vehicle. The engagement piece 34A extends from a lower portion of the third resin component 34 to the left side of the vehicle, and three substantially cylindrical engagement protrusions 34B are formed on an upper surface of the engagement piece 34A. The three engagement protrusions 34B are respectively engaged with a fourth resin component 36 described below.

An engagement piece 34C extends from the right end portion of the third resin component 34 toward the right side of the vehicle. The engagement piece 34C extends from a lower portion of the third resin component 34 to the right side of the vehicle, and three substantially cylindrical engagement protrusions 34D are formed on an upper surface of the engagement piece 34C. The three engagement protrusions 34D are formed in shapes respectively corresponding to the engagement grooves 32D of the second resin component 32, and the second resin component 32 and the third resin component 34 are coupled together by engaging the engagement protrusions 34D with the engagement grooves 32D.

A fourth resin component 36 is disposed to the left of the third resin component 34. The fourth resin component 36 configures a left end portion of the pedestal 12. The fourth resin component 36 is configured including an upper wall section 36A, a front wall section 36B, and a left wall section 36C. The upper wall section 36A is formed in a curved surface that is continuous with the upper surface of the third resin component 34.

Three engagement grooves 36D are formed in the lower surface of the upper wall section 36A of the fourth resin component 36 and are hollowed out in a substantially cylindrical shape, and the engagement protrusions 34B of the third resin component 34 are engaged with the respective engagement grooves 36D.

The first resin component 30, the second resin component 32, the third resin component 34, and the fourth resin component 36 configuring the pedestal 12 are configured as described above, and as illustrated in FIG. 3, in a state in which the first resin component 30, the second resin component 32, the third resin component 34, and the fourth resin component 36 are joined in the vehicle width direction, an upper surface 12A of the pedestal 12 is formed in a shape conforming to the rear seat. More specifically, the upper surface 12A of the pedestal 12 is smoothly curved so as to form concave portions on the left and the right, and a central portion of the rear seat 100 is disposed in each of the concave portions.

A right side wall section 12B and a left side wall section 12B of the pedestal 12 are each formed in a shape that covers a side surface of the battery unit 14 from an outer side in the vehicle width direction. More specifically, an end surface of the front wall section 30B of the first resin component 30 configuring the pedestal 12 at an inner side in the vehicle width direction (at the vehicle left side) is abutted against a front side surface of the battery unit 14. Similarly, an end face of the front wall section 36B of the fourth resin component 36 configuring the pedestal 12 at an inner side in the vehicle width direction (at the vehicle right side) is abutted against a front side surface of the battery unit 14.

At the right side face of the battery unit 14, a space is provided between a surface rearward of a portion against which the front wall section 30B is abutted and the right wall section 30C of the first resin component 30, and a fan or the like can be disposed to cool the battery unit 14. Similarly, on the left side of the battery unit 14, a space is provided between a surface rearward of a portion against which the front wall section 36 B is abutted and the left wall section 36C of the fourth resin component 36.

Moreover, notches having a shape cut toward the rear of the vehicle are respectively formed between the first resin component 30 and the second resin component 32, and between the third resin component 34 and the fourth resin component 36, of the pedestal 12, and the mounting bracket 22 is disposed at the position of the notches. In other words, the pedestal 12 is formed in a shape that avoids the mounting bracket 22. Although not illustrated in the drawings, in the present exemplary embodiment, the front end of the pedestal 12 is disposed substantially flush with the front end of the battery unit 14.

As illustrated in FIG. 1, a concave part 12C corresponding to the convex part 24 is formed on the bottom surface of the pedestal 12. Accordingly, in a state in which the pedestal 12 is mounted, the convex part 24 is configured to enter the concave part 12C so as to bring the pedestal 12 and the battery unit 14 into close contact with each other.

(Mechanism)

Next, explanation follows regarding the mechanism of the present exemplary embodiment.

According to the vehicle rear seat structure 10 of the present exemplary embodiment, a rear seat 100 is disposed at a rear part of the vehicle cabin, and a battery unit 14 is disposed at a vehicle lower side of the rear seat 100. A resin pedestal 12 is provided between the rear seat 100 and the battery unit 14, and the pedestal 12 is formed in a shape in which a vertical direction of the vehicle is a plate thickness direction, and an upper surface 12A thereof conforms to the rear seat 100. As described above, the pedestal 12 is provided between the rear seat 100 and the battery unit 14, and the upper surface 12A of the pedestal 12 has a shape that conforms to the rear seat 100, as a result of which, even in cases in which the upper surface of the battery unit 14 is formed in an uneven shape, the riding comfort of the rear seat 100 can be improved.

Moreover, in the present exemplary embodiment, the side surfaces of the battery unit 14 are covered from the outer side in the vehicle width direction by the first resin component 30 and the fourth resin component 36 configuring the side wall sections of the pedestal 12. This enables the battery to be protected by the pedestal 12 during a side collision of the vehicle V.

Figure 3:
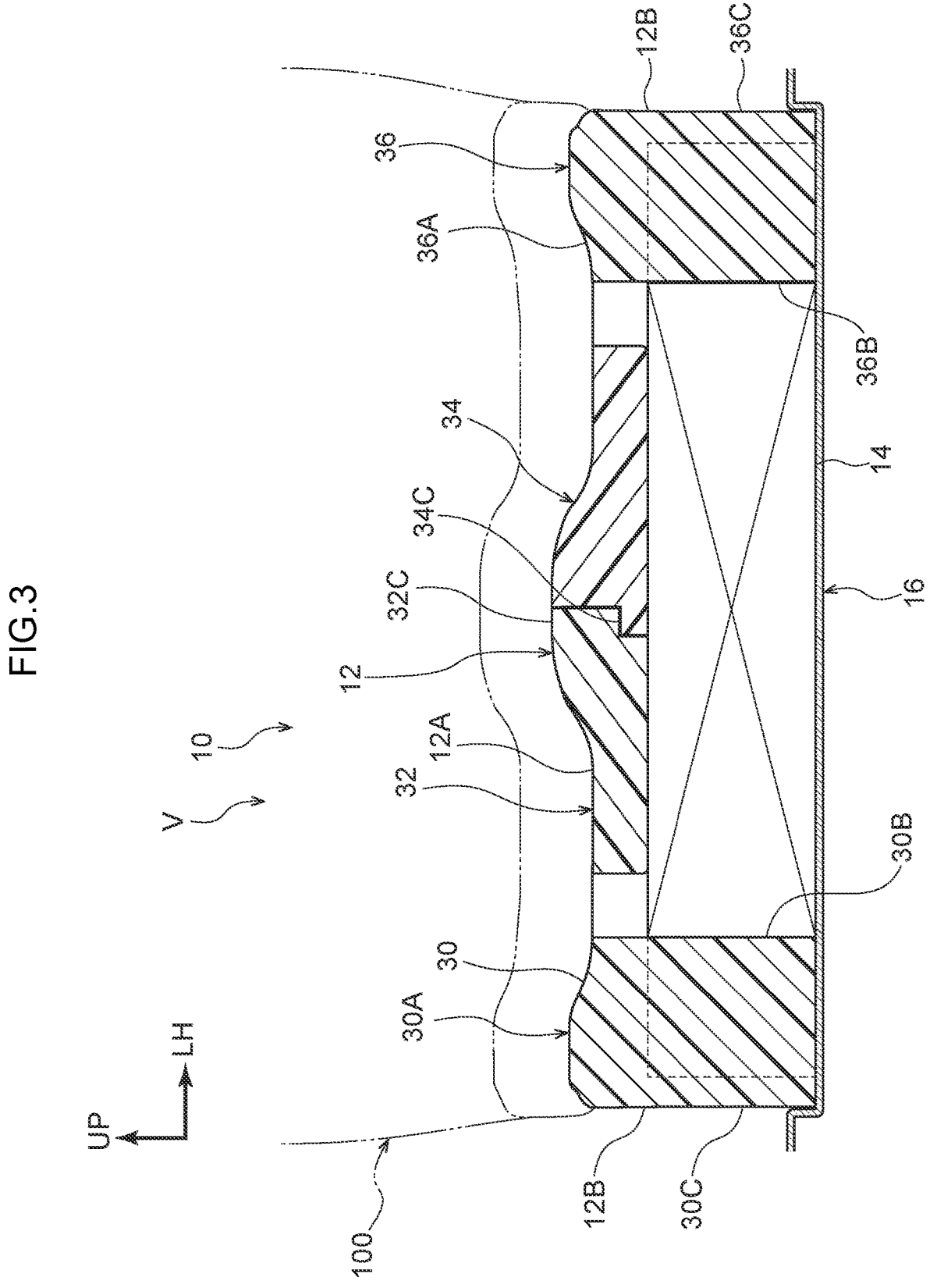
FIG. 3 is a cross-sectional view illustrating a state sectioned along line 3-3 of FIG. 2.

In particular, in the present exemplary embodiment, as illustrated in FIG. 3, since the first resin component 30 and the fourth resin component 36 of the pedestal 12 are configured to abut against the sides of the battery unit 14, any load that is input from the sides of the vehicle V during a side collision can be effectively transmitted to the opposite side from the collision via the pedestal 12 and the battery unit 14.

Moreover, in the present exemplary embodiment, as illustrated in FIG. 1, the convex part 24 on the battery unit 14 side can be engaged with the concave part 12C formed on the bottom surface of the pedestal 12, and the pedestal 12 and the battery unit 14 can be brought into close contact with each other. Note that in the present exemplary embodiment, by forming the convex part 24 with a hat-shaped cross section, a wire harness or the like can be provided inside the convex part 24. Moreover, since the convex part 24 extends in the vehicle width direction, even in cases in which the pedestal 12 is formed of resin, if the convex part 24 is formed of sheet metal or the like, the pedestal 12 can be reinforced, and the load can be effectively transmitted in the vehicle width direction.

Moreover, in the present exemplary embodiment, since the pedestal 12 is formed from plural (four) resin components, compared to a structure in which the pedestal 12 is integrally formed of resin, the components can be efficiently transported. In particular, since each of the first resin component 30, the second resin component 32, the third resin component 34, and the fourth resin component 36 are formed of resin, they are lighter than metals, and are, therefore, easier to transport.

Moreover, compared to a structure in which the pedestal 12 is integrally formed of resin, no large-sized devices are required to mold the pedestal 12, enabling increases in manufacturing costs to be suppressed.

Although explanation has been given regarding the vehicle rear seat structure 10 according to the exemplary embodiment, it is, of course, the case that various embodiments may be implemented within a range not departing from the gist of the present disclosure. For example, in the above exemplary embodiment, a convex part 24 and a mounting bracket 22 are provided on an upper surface of the battery unit 14, and the pedestal 12 is shaped so as to avoid the convex part 24 and the mounting bracket 22; however, there is no limitation to this. In cases in which components such as a fan are provided on the upper surface of the battery unit 14, similarly to the present exemplary embodiment, the upper surface of the battery unit 14 is formed in an uneven shape, but by forming the lower surface of the pedestal 12 in a shape corresponding to the uneven shape, advantageous effects can be obtained similarly to the present exemplary embodiment.

In the above exemplary embodiments, although explanation has been given regarding a structure in which two rear seats 100 are disposed at a rear part of the vehicle V, as illustrated in FIG. 3, there is no limitation to this. For example, the present invention may be applied to a structure in which a bench seat is disposed at a rear part of the vehicle V. In this case, the upper surface 12A of the pedestal 12 is formed in a shape corresponding to the shape of the lower surface of the bench seat.

Moreover, in the above exemplary embodiments, as illustrated in FIG. 2, the engagement protrusions formed on one side of adjacent resin components are engaged with the engagement grooves formed on the other side in order to connect the adjacent resin components; however, there is no limitation thereto, and other structures may be adopted. For example, adjacent resin components may be mechanically fastened together by bolts, nuts, or the like, or may be joined together by an adhesive or the like.

What is claimed is:

1. A vehicle rear seat structure, comprising:

a rear seat disposed at a rear part inside a vehicle cabin;

a battery unit disposed at a vehicle lower side of the vehicle rear seat; and a resin pedestal provided between the rear seat and the battery unit, the pedestal having a plate thickness in a vehicle vertical direction, and an upper surface of the pedestal being formed in a shape that conforms to the rear seat, wherein the pedestal is formed by a plurality of resin members, the plurality of resin members being joined in a vehicle width direction, and wherein, among adjacent resin members of the plurality of resin members, one of the adjacent resin members is formed with an engagement groove hollowed out in a cylindrical shape, and another of the adjacent resin members is formed with a cylindrical engagement protrusion corresponding to the engagement groove.

2. The vehicle rear seat structure of claim 1, wherein the pedestal is provided with a side wall portion, side wall portion covering a side face of the battery unit from an outer side in a vehicle width direction.

3. The vehicle rear seat structure of claim 1, wherein a concave part is formed at a lower surface of the pedestal, the concave part corresponding to a convex part formed at an upper surface of the battery unit.

4. A vehicle, including the vehicle rear seat structure of claim 1.

* * * * *